United States Patent
Weinstein et al.

(10) Patent No.: US 11,858,760 B1
(45) Date of Patent: Jan. 2, 2024

(54) SYSTEMS AND METHODS FOR FILLING A PROPPANT SILO

(71) Applicant: SOLARIS OILFIELD SITE SERVICES OPERATING LLC, Houston, TX (US)

(72) Inventors: Jeremy Weinstein, Tomball, TX (US); Scott Lambert, The Woodlands, TX (US); Jeffrey Martinez, The Woodlands, TX (US)

(73) Assignee: SOLARIS OILFIELD SITE SERVICES OPERATING LLC, Houston, TX (US)

( * ) Notice: Subject to any disclaimer, the term of this patent is extended or adjusted under 35 U.S.C. 154(b) by 0 days.

(21) Appl. No.: 18/325,391

(22) Filed: May 30, 2023

(51) Int. Cl.
*B65G 65/32* (2006.01)
*B65G 41/00* (2006.01)
*B65G 3/04* (2006.01)

(52) U.S. Cl.
CPC .............. *B65G 65/32* (2013.01); *B65G 3/04* (2013.01); *B65G 41/002* (2013.01); *B65G 41/008* (2013.01); *B65G 2201/042* (2013.01)

(58) Field of Classification Search
None
See application file for complete search history.

(56) References Cited

U.S. PATENT DOCUMENTS

| | | | |
|---|---|---|---|
| 9,428,348 B2 * | 8/2016 | Teichrob | B65D 88/32 |
| 10,633,174 B2 * | 4/2020 | Pham | B65D 88/54 |
| 11,691,831 B2 * | 7/2023 | Sleeman | B65G 47/58 |
| | | | 198/538 |
| 2016/0244268 A1 * | 8/2016 | Ritter | B65G 41/008 |

* cited by examiner

*Primary Examiner* — Kavel Singh
(74) *Attorney, Agent, or Firm* — MH2 TECHNOLOGY LAW GROUP, LLP

(57) ABSTRACT

A system includes a base configured to be positioned on a ground. The base includes a first conveyor configured to convey a granular material. The system also includes a derrick coupled to the base. The derrick is configured to be oriented substantially horizontally when the system is in a folded state. The derrick is configured to be oriented substantially vertically when the system is in an unfolded state. The derrick includes a second conveyor configured to receive the granular material from the first conveyor and to convey the granular material. The system also includes a first arm coupled to the derrick. The first arm includes a third conveyor configured to receive the granular material from the second conveyor and to convey the granular material.

19 Claims, 9 Drawing Sheets

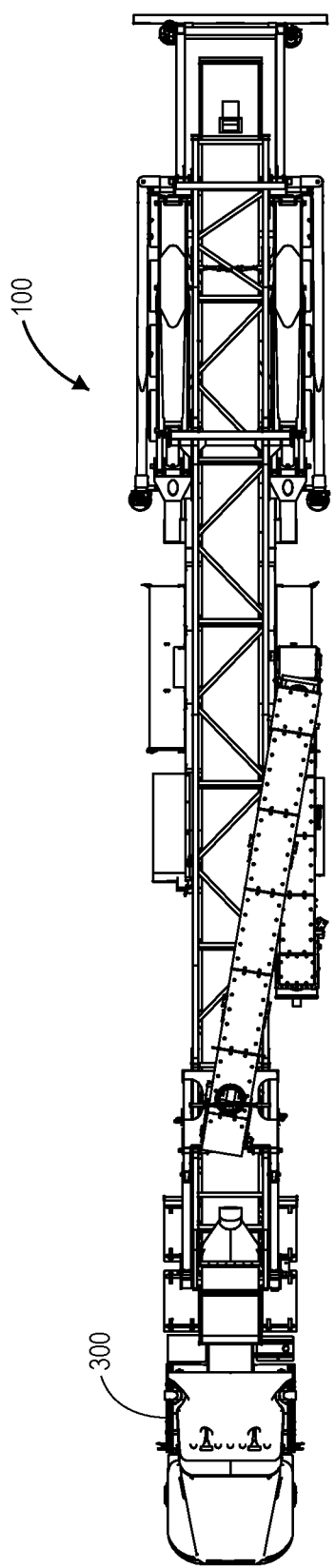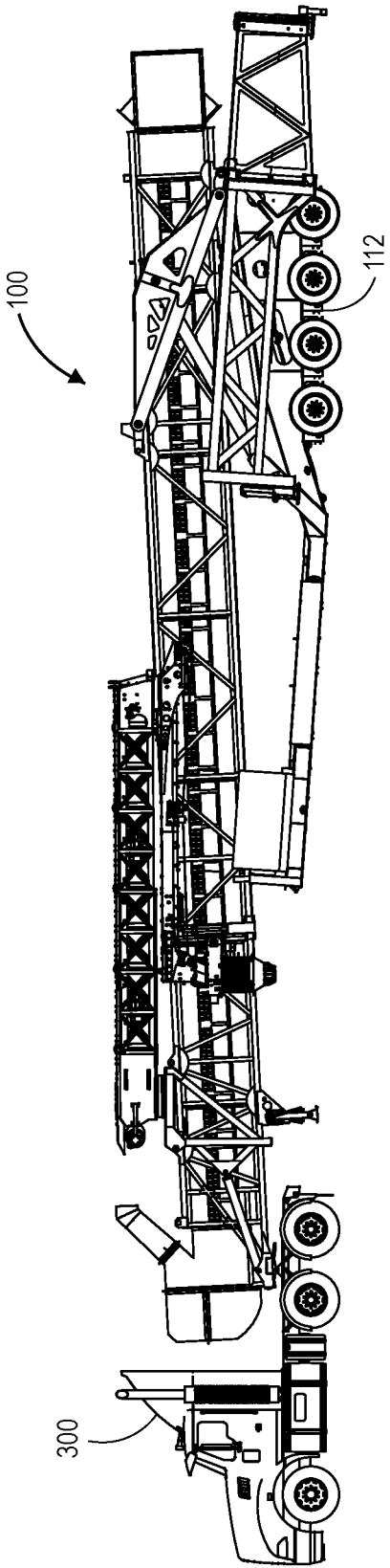
FIG. 3A
FIG. 3B

SYSTEMS AND METHODS FOR FILLING A PROPPANT SILO

BACKGROUND

Hydraulic fracturing (also called fracking) is a well-stimulation technique involving the fracturing of bedrock formations by a pressurized liquid. The process involves the high-pressure injection of a fracking fluid into a wellbore to create fractures (e.g., cracks) in the deep-rock formations. The fracking fluid may be or include water containing proppants (e.g., sand or aluminum oxide) suspended with the aid of thickening agents. When the hydraulic pressure is removed from the wellbore, the proppants hold the fractures open to allow natural gas, petroleum, and/or brine to flow through the fractures, up the wellbore, and to the surface.

The proppants may be stored in one or more silos at the wellsite. The proppant is typically loaded into the silos by either a conventional pneumatic conveyor or a conventional belt conveyor. The conventional pneumatic conveyer has a low transfer rate (e.g., 1000-1500 pounds per minute). The conventional belt conveyor cannot be sloped at an angle greater than about 15 degrees. As a result, the conventional belt conveyor has a large footprint at the wellsite (e.g., about 100 feet).

SUMMARY

A system is disclosed. The system includes a base configured to be positioned on a ground. The base includes a first conveyor configured to convey a granular material. The system also includes a derrick coupled to the base. The derrick is configured to be oriented substantially horizontally when the system is in a folded state. The derrick is configured to be oriented substantially vertically when the system is in an unfolded state. The derrick includes a second conveyor configured to receive the granular material from the first conveyor and to convey the granular material. The system also includes a first arm coupled to the derrick. The first arm includes a third conveyor configured to receive the granular material from the second conveyor and to convey the granular material.

A mobile silo-filling system is also disclosed. The system includes a base configured to be positioned on a ground. The base includes a truck unloader having a plurality of wheels. The base also includes a first conveyor configured to convey a proppant. The first conveyor is a trough-style unloading conveyor. The system also includes a derrick having a first end that is coupled to the base. The derrick is configured to be oriented substantially horizontally when the system is in a folded state. The system is configured to be coupled to a vehicle and to be moved by the vehicle when in the folded state. The derrick is configured to be oriented at an angle from about 20 degrees to about 70 degrees when the system is in a partially unfolded state. The derrick is configured to be oriented substantially vertically when the system is in an unfolded state. The derrick includes a second conveyor configured to receive the proppant from the first conveyor and to convey the proppant when the system is in the partially unfolded state, the unfolded state, or both. The second conveyor is a bucket elevator. The system also includes one or more hydraulic cylinders coupled to the base and the derrick. The one or more hydraulic cylinders are configured to actuate the system between the folded state, the partially unfolded state, and the unfolded state. The system also includes a first arm having a first end that is coupled to a second end of the derrick. The first arm is configured to be substantially horizontal when the system is in the folded state, the partially unfolded state, and the unfolded state. The first arm is configured to rotate around the first end thereof in a first horizontal plane. The first arm includes a third conveyor configured to receive the proppant from the second conveyor and to convey the proppant. The third conveyor is a trough-style distributing conveyor. The system also includes a first slewing gear configured to transfer the proppant from the second conveyor to the third conveyor. The system also includes a second arm having a first end that is coupled to a second end of the first arm. The second arm is positioned below the first arm. The second arm is configured to be substantially horizontal when the system is in the folded state, the partially unfolded state, and the unfolded state. The second arm is configured to rotate around the first end thereof in a second horizontal plane. The second arm includes a fourth conveyor configured to receive the proppant from the third conveyor and to convey the proppant. The fourth conveyor is a trough-style distributing conveyor. The system also includes a second slewing gear configured to transfer the proppant from the third conveyor to the fourth conveyor. The system also includes a loading spout coupled to the second arm proximate to a second end of the second arm. The loading spout is configured to telescope vertically. The loading spout is configured to receive the proppant from the fourth conveyor and to load the proppant into an inlet in an upper portion of a silo.

A method for loading proppant into a silo is also disclosed. The method includes positioning a system at a wellsite using a vehicle. The system includes a base, a derrick, a first arm, and a second arm. The method also includes decoupling the system from the vehicle once the system is positioned. The system is in a folded state when positioned and decoupled. The derrick is oriented substantially horizontally when the system is in the folded state. The method also includes actuating the system into an unfolded state after the system is decoupled. The derrick is oriented substantially vertically when the system is in the unfolded state. The method also includes conveying the proppant when the system is in the unfolded state. The proppant is conveyed from a first conveyor on the base, to a second conveyor on the derrick, to a third conveyor on the first arm, to a fourth conveyor on the second arm, and into the silo.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 3A and 3B illustrate a top view and a side view of the system coupled to a vehicle and in a folded state, according to an embodiment.

DETAILED DESCRIPTION

Reference will now be made in detail to specific embodiments illustrated in the accompanying drawings and figures. In the following detailed description, numerous specific details are set forth in order to provide a thorough understanding of the embodiments described herein. However, it will be apparent to one of ordinary skill in the art that other embodiments may be practiced without these specific details. In other instances, well-known methods, procedures, components, circuits, and networks have not been described in detail so as not to unnecessarily obscure aspects of the embodiments.

Figure 1:
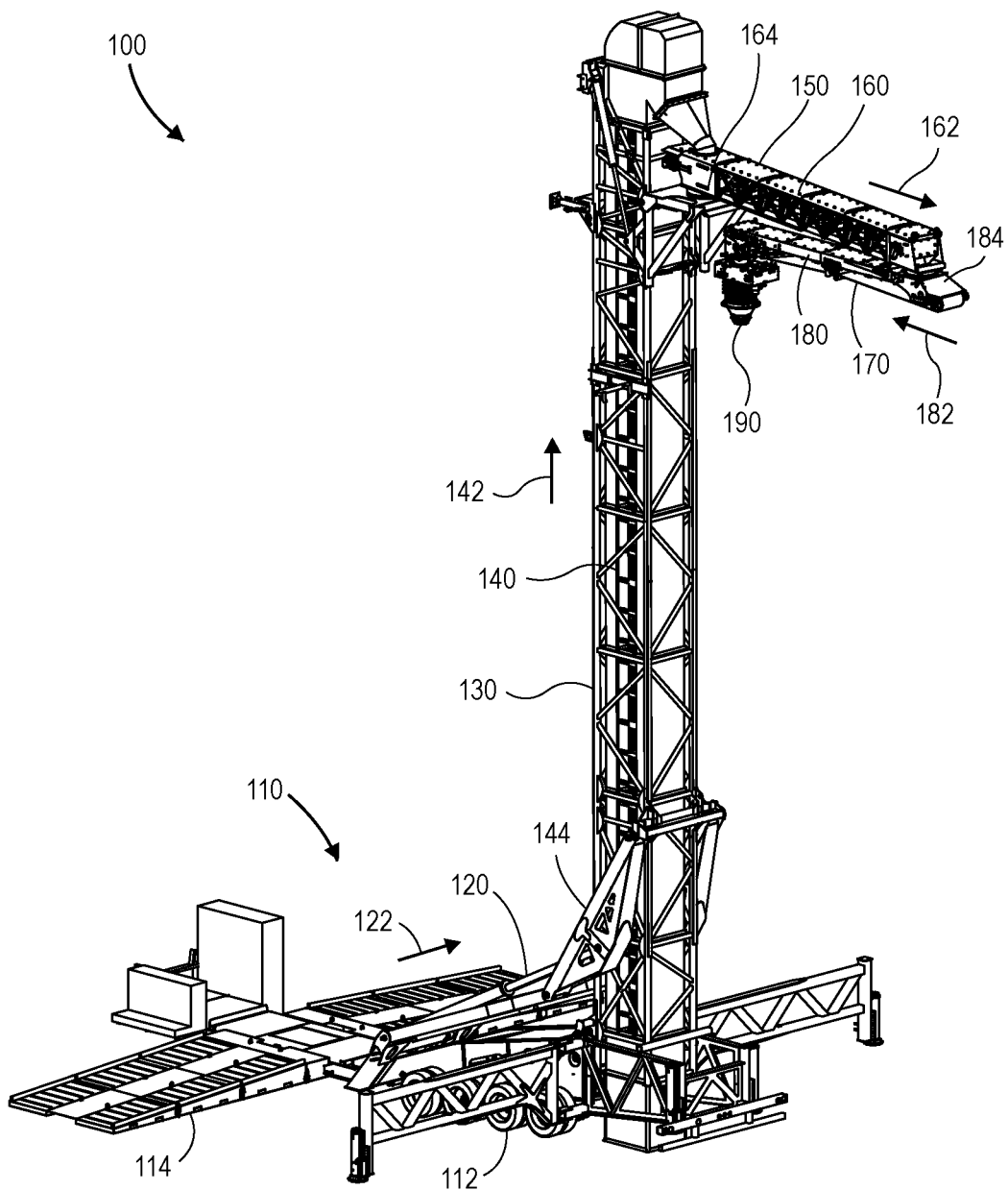
FIG. 1 illustrates a perspective view of a mobile silo-filling system, according to an embodiment.

FIG. 1 illustrates a perspective view of a mobile silo-filling system 100, according to an embodiment. The system 100 may be configured to transport or convey a material from a first (e.g., lower) location to a second (e.g., upper) location. The material may be or include a granular material. For example, the material may be a proppant (e.g., sand or aluminum oxide particles) that may be used to produce a fracking fluid, and the upper location may be an inlet of a vertical silo at a wellsite.

The system 100 may include a base 110 that is configured to be position on the ground at the wellsite. The base 110 may include a truck unloader 112 (e.g., including one or more wheels). The base 110 may also include one or more loading ramps 114 that slope upward toward one another. The base 110 may also include a first (e.g., trough-style unloading) conveyor 120. The first conveyor 120 may be configured to convey the material (e.g., proppant) from a truck in a first direction 122. The first direction 122 may be horizontal or sloped upwards (e.g., from about 5 degrees to about 30 degrees).

The system 100 may also include a derrick 130 that is coupled to the base 110. More particularly, a first (e.g., lower) end of the derrick 130 may be coupled to the base 110. The derrick 130 may be configured to rotate (e.g., about a central longitudinal axis therethrough) with respect to the (e.g., stationary) base 110. The derrick 130 may include a second (e.g., bucket elevator) conveyor 140 therein, which may differ from the first (e.g., trough-style unloading) conveyor 120. The second conveyor 140 may be coupled to and/or in communication with the first conveyor 120. More particularly, the second conveyor 140 may be configured to receive the material from the first conveyor 120 and to convey the material in a second (e.g., vertical) direction 142. The system 100 may also include one or more hydraulic cylinders 144 that is/are configured to actuate the derrick 130 from a substantially horizontal position to a substantially vertical position, as described below.

The system 100 may also include a first arm 150 that is coupled to the derrick 130. More particularly, a first (e.g., inner) end of the first arm 150 may be coupled to a second (e.g., upper) end of the derrick 130. The first arm 150 may be configured to rotate with respect to the derrick 130. More particularly, the first arm 150 may rotate around the first end thereof in a horizontal plane through an angle. A maximum extent of the angle may be from about 90 degrees to about 360 degrees or from about 180 degrees to about 270 degrees. The first arm 150 may include a third (e.g., trough-style distributing) conveyor 160, which may differ from the first (e.g., trough-style unloading) conveyor 120 and/or the second (e.g., bucket elevator) conveyor 140. The third conveyor 160 may be coupled to and/or in communication with the second conveyor 140. The third conveyor 160 may be configured to receive the material from the second conveyor 140 and to convey the material in a third (e.g., horizontal) direction 162. In one embodiment, the material may be transferred from the second conveyor 140 to the third conveyor 160 via one or more first slewing drives (also referred to as slewing gears) 164.

The system 100 may also include a second arm 170 that is coupled to the first arm 150. More particularly, a first end of the second arm 170 may be coupled to a second (e.g., outer) end of the first arm 150. The second arm 170 may be positioned at least partially below the first arm 150. The second arm 170 may be configured to rotate with respect to the first arm 150. More particularly, the second arm 170 may rotate around the first end thereof in a horizontal plane through an angle. A maximum extent of the angle of the second arm 170 may be greater than a maximum extent of the angle of the first arm 150. In an example, the maximum extent of the angle of the second arm 170 may be from about 180 degrees to about 360 degrees or from about 270 degrees to about 360 degrees. The second arm 170 may include a fourth (e.g., trough-style distributing) conveyor 180 that is coupled to and/or in communication with the third conveyor 160. The fourth conveyor 180 may be configured to receive the material from the third conveyor 160 and to convey the material in a fourth (e.g., horizontal) direction 182. The fourth direction 182 may be the same as or different from the third direction 162, depending upon the angles at which the arms 150, 170 are oriented. In one embodiment, the material may be transferred from the third conveyor 160 to the fourth conveyor 180 via one or more second slewing drives (also referred to as slewing gears) 184.

The system 100 may also include a loading spout 190 that is coupled to and/or in communication with the fourth conveyor 180. The loading spout 190 may be located proximate to a second end of the second arm 170. The material may be configured to flow from the fourth conveyor 180, through the loading spout 190, and into the top of a silo at a wellsite. In one embodiment, the loading spout 190 may be configured to telescope (e.g., vertically) to extend toward and/or away from the inlet of the silo.

Figure 2:
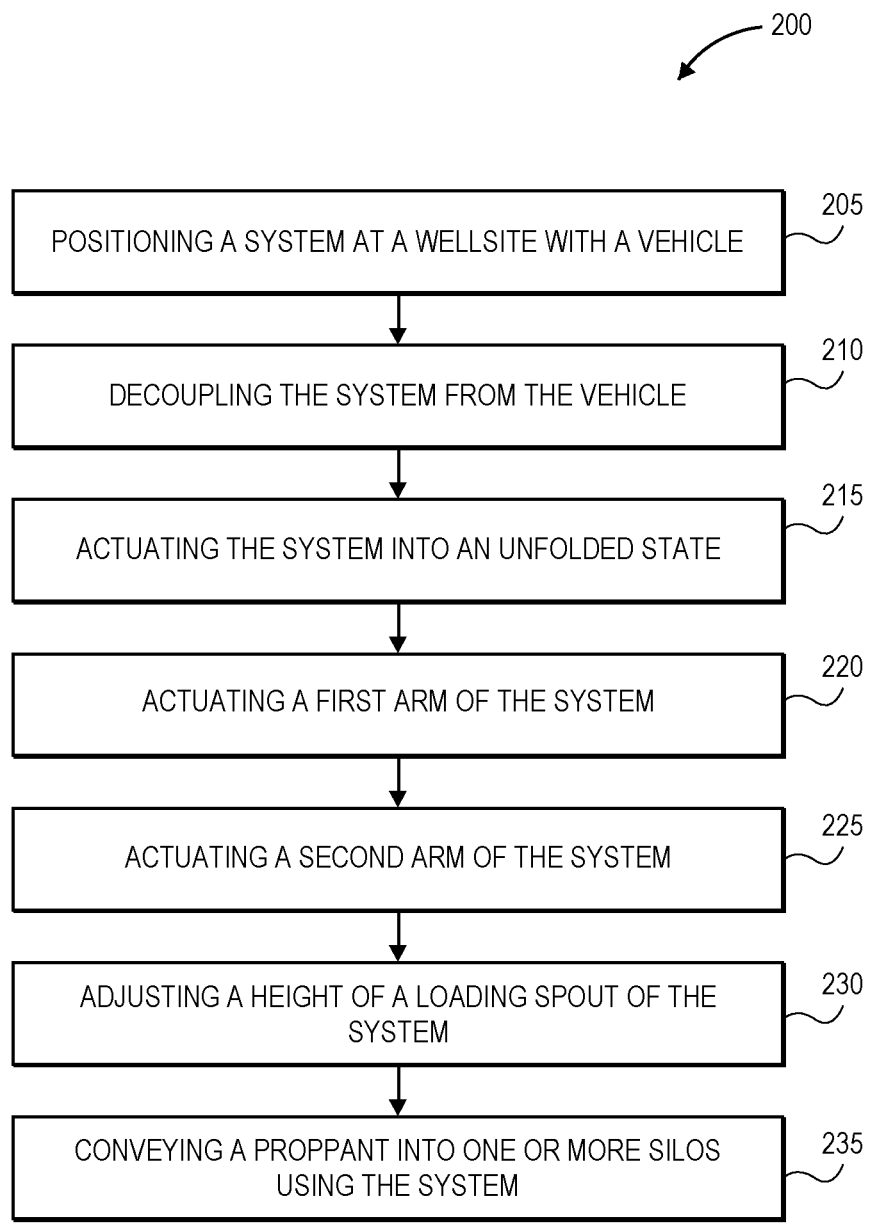
FIG. 2 illustrates a flowchart of a method for loading proppant into a silo (e.g., using the system), according to an embodiment.

FIG. 2 illustrates a flowchart of a method 200 for loading the proppant into a silo, according to an embodiment. An illustrative order of the method 200 is provided below; however, one or more steps of the method 200 may be performed in a different order, simultaneously, repeated, or omitted.

The method 200 may include positioning the system 100 at a wellsite, as at 205. The system 100 may be coupled to and/or positioned by a vehicle 300, as shown in FIGS. 3A and 3B. The system 100 may be in a first (e.g., folded) state when the system 100 is being moved and/or positioned by the vehicle 300. This may allow the vehicle 300 to position the system 100 at any location and/or orientation at the wellsite. The derrick 130 may be substantially horizontal when the system 100 is in the folded state. In the folded state, the system 100 may have a length from about 40 feet to about 80 feet or about 50 feet to about 70 feet and a height from about 8 feet to about 16 feet or about 10 feet to about 14 feet. In contrast, conventional belt conveyors have a length of greater than or equal to about 100 feet.

Figure 4:
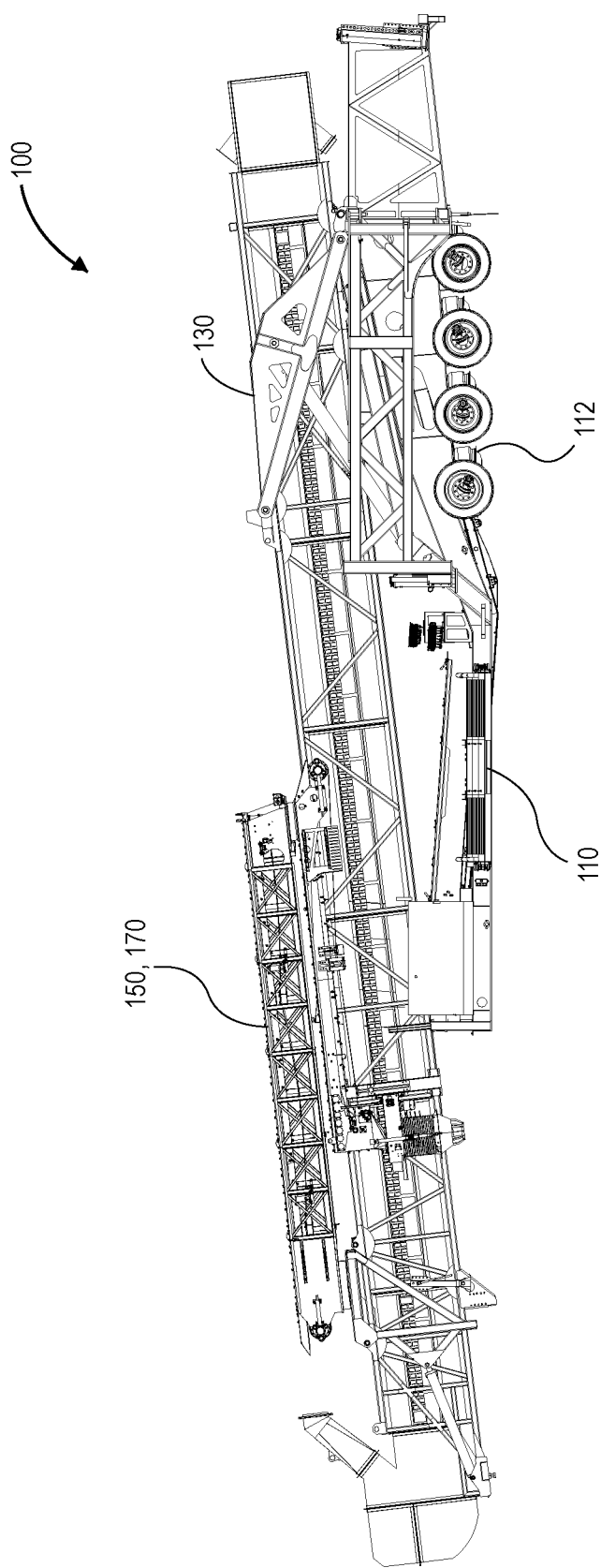
FIG. 4 illustrates a side view of the system after being decoupled from the vehicle in the folded state, according to an embodiment.

The method 200 may also include decoupling the system 100 from the vehicle 300, as at 210. The system 100 may be decoupled after the system 100 has been positioned at the desired location at the wellsite (e.g., proximate to one or more silos). As shown in FIG. 4, the system 100 may be in the folded state when the system 100 is decoupled from the vehicle 100.

Figure 5:
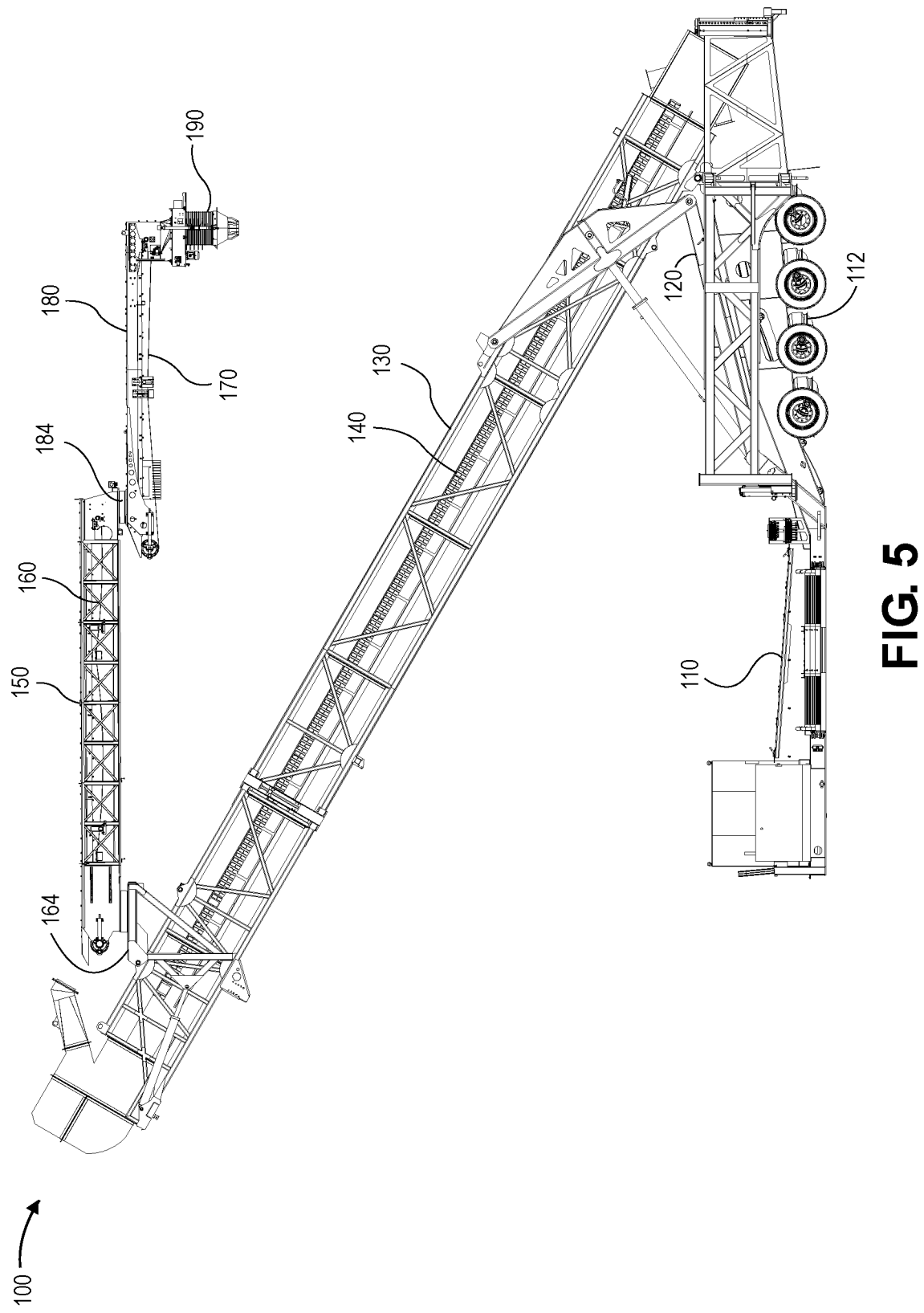
FIG. 5 illustrates a side view of the system in a first partially unfolded state with a derrick oriented at about 30 degrees, according to an embodiment.
Figure 6:
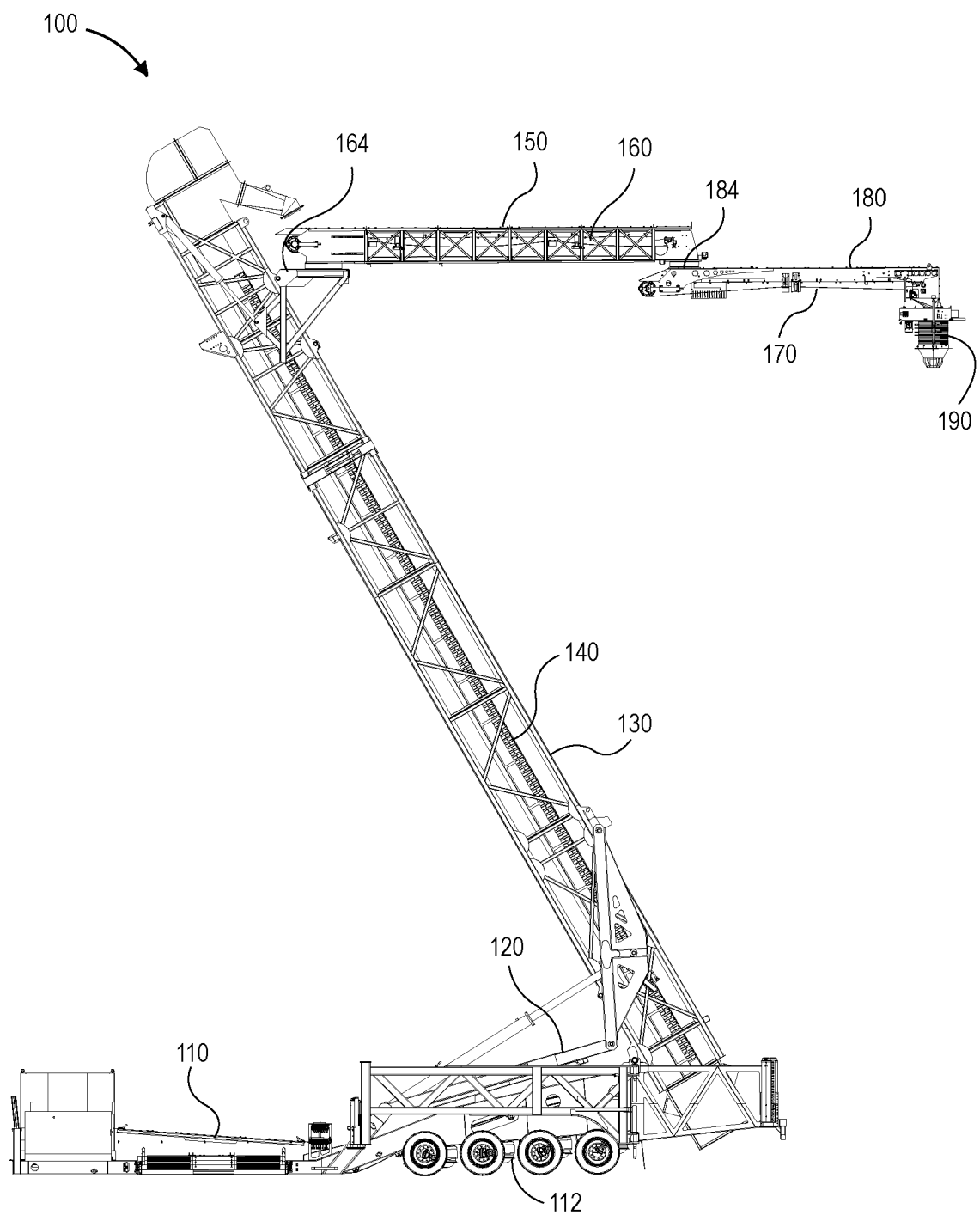
FIG. 6 illustrates a side view of the system in a second partially unfolded state with the derrick oriented at about 60 degrees, according to an embodiment.
Figure 7:
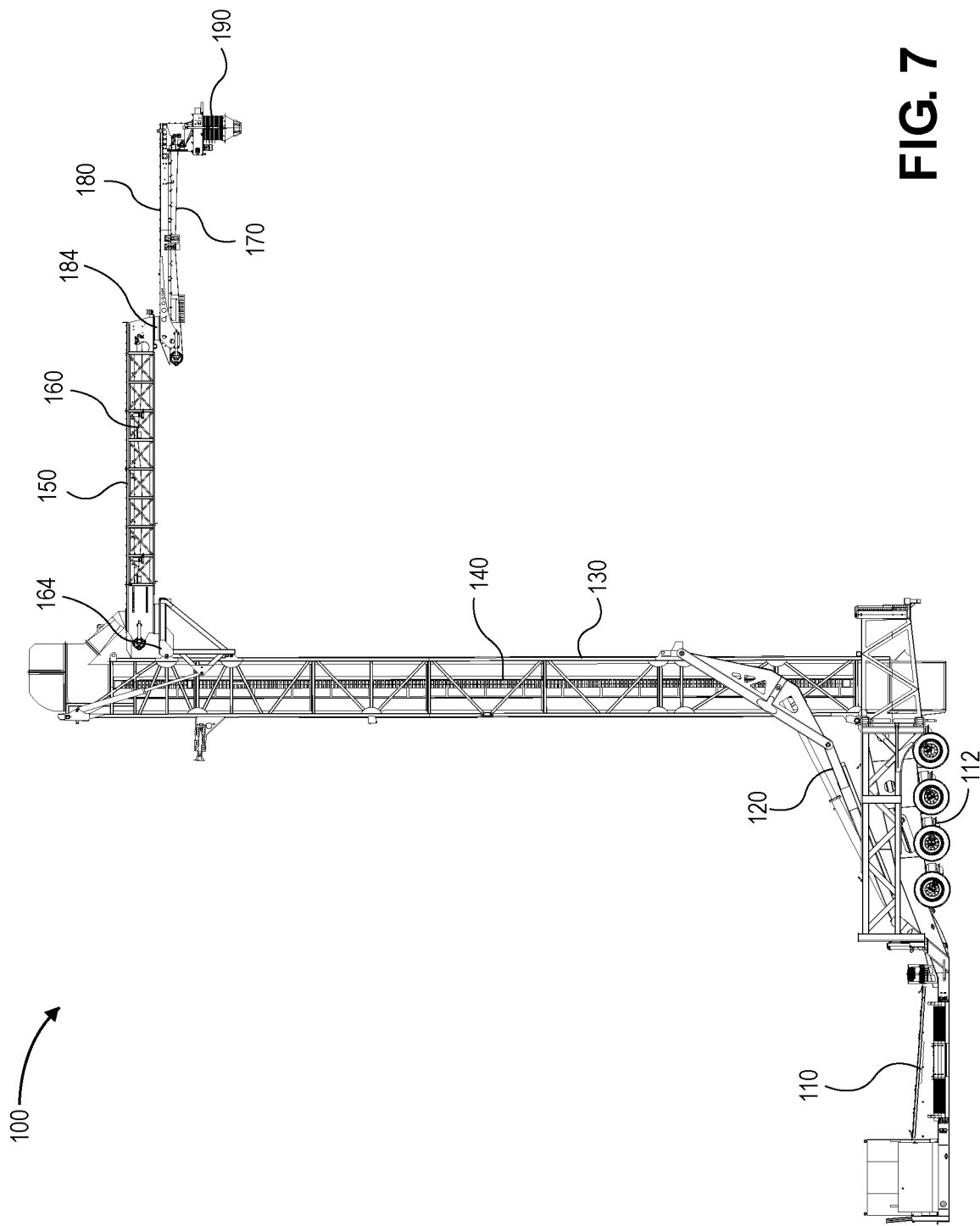
FIG. 7 illustrates a side view of the system in an unfolded state with the derrick oriented at about 90 degrees (e.g., vertical) and an outer arm of the system in a first (e.g., extended) position, according to an embodiment.

The method 200 may also include actuating the system 100 into an unfolded state, as at 215. The system 100 may be actuated into the unfolded state after the system 100 is positioned and/or decoupled. FIG. 5 illustrates the system 100 actuated into a first partially unfolded state (e.g., with the derrick 130 oriented at 30 degrees with respect to the ground), FIG. 6 illustrates the system 100 actuated into a second partially unfolded state (e.g., with the derrick 130 oriented at 60 degrees with respect to the ground), and FIG. 7 illustrates a side view of the system 100 actuated in the unfolded state (e.g., with the derrick 130 oriented at 90 degrees with respect to the ground), according to an embodiment. In contrast, conventional belt conveyors cannot exceed an angle greater than about 15 degrees.

In the embodiment shown, the arms 150, 170 and/or the conveyors 160, 180 may be/remain substantially horizontal as the derrick 130 actuates through an arc from the horizontal position to the vertical position. In another embodiment, the arms 150, 170 and/or the conveyors 160, 180 may be/remain parallel to the derrick 130 as the derrick 130 actuates through the arc from the horizontal position to the vertical position, and then the arms 150, 170 and/or the conveyors 160, 180 may actuate to become substantially horizontal.

The method 200 may also include actuating the first arm 150, as at 220. The first arm 150 may be actuated around a vertical axis that extends through a first end of the first arm 150 that is coupled to the derrick 130. As mentioned above, this may include moving the first arm 150 through an arc in a horizontal plane up to about 270 degrees. The first arm 150 may be actuated when the system 100 is in the partially unfolded state and/or the unfolded state.

The method 200 may also include actuating the second arm 170, as at 225. The second arm 170 may be actuated around a vertical axis that extends through a first end of the second arm 170 that is coupled to the second end of the first arm 150. As mentioned above, this may include moving the second arm 170 through an arc in a horizontal plane up to about 360 degrees. The horizontal plane of the first arm 150 may be above the horizontal plane of the second arm 170. The second arm 150 may be actuated when the system 100 is in the partially unfolded state and/or the unfolded state. The second arm 170 may be actuated before, simultaneously with, or after the first arm 150 is actuated.

Figure 8:
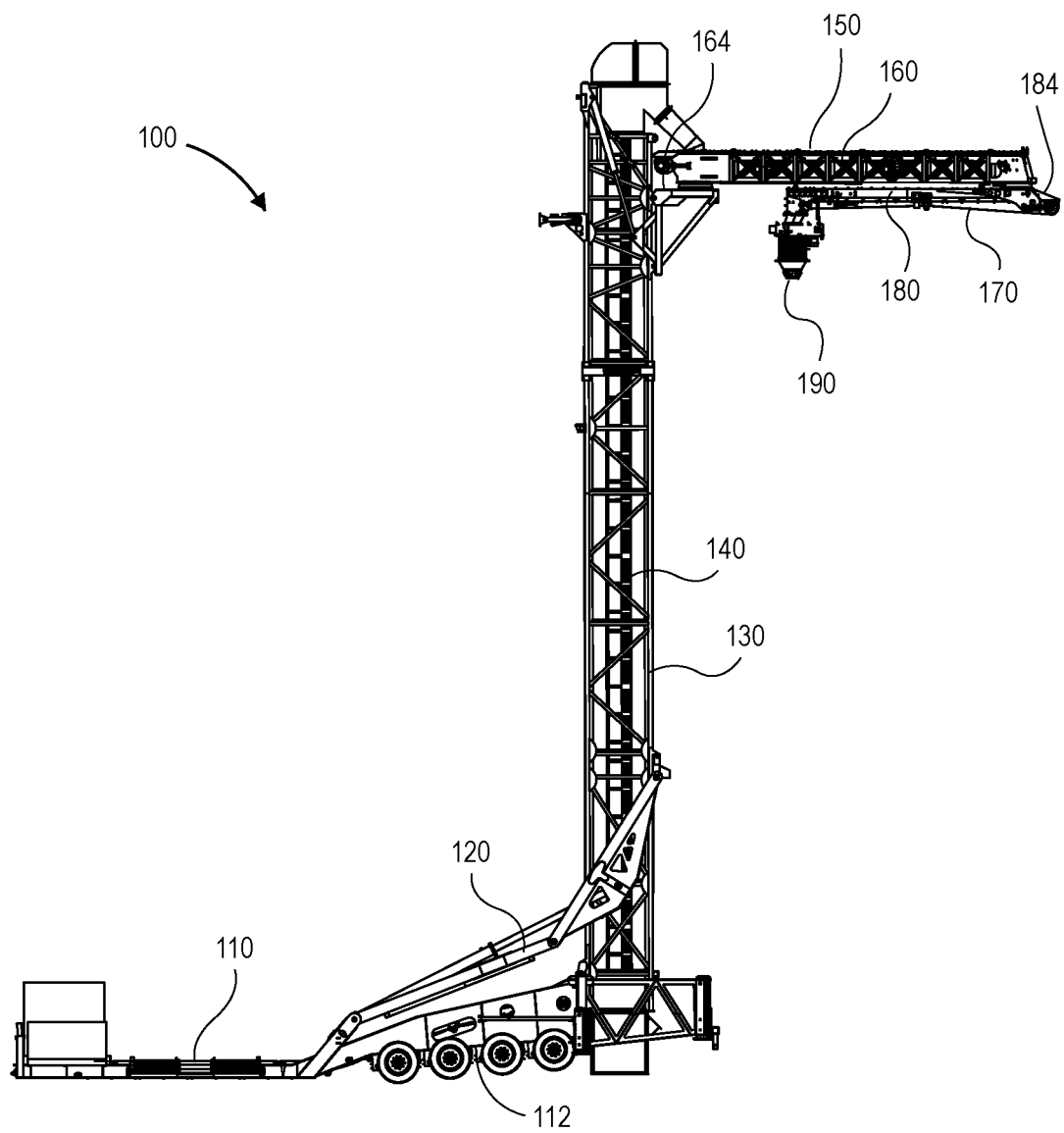
FIG. 8 illustrates a side view of the system in the unfolded state with the outer arm in a second (e.g., retracted) position, according to an embodiment.

In the embodiment shown, the first and second arms 150, 170 are substantially parallel with one another as the as the system 100 actuates from the folded state (e.g., FIG. 4) into the unfolded state (e.g., FIG. 7). More particularly, the second arm 170 is in a first (e.g., extended) position such that the second end of the second arm 170 is not positioned under the first arm 150, and a total (e.g., horizontal) distance between the derrick 130 and the loading spout 190 is maximized. In another embodiment, the second arm 170 may be in a second (e.g., retracted) position as the as the system 100 actuates from the folded state into the unfolded state, as shown in FIG. 8. In the retracted position, the second arm 170 is positioned under the first arm 150, and the total (e.g., horizontal) distance between the derrick 130 and the loading spout 190 is minimized. In yet another embodiment, the second arm 170 may be configured to actuate between the extended and retracted positions while the system 100 is actuating. In yet another embodiment, the second arm 170 may be configured to actuate between the extended and retracted positions once the system 100 is in the unfolded state.

Figure 9:
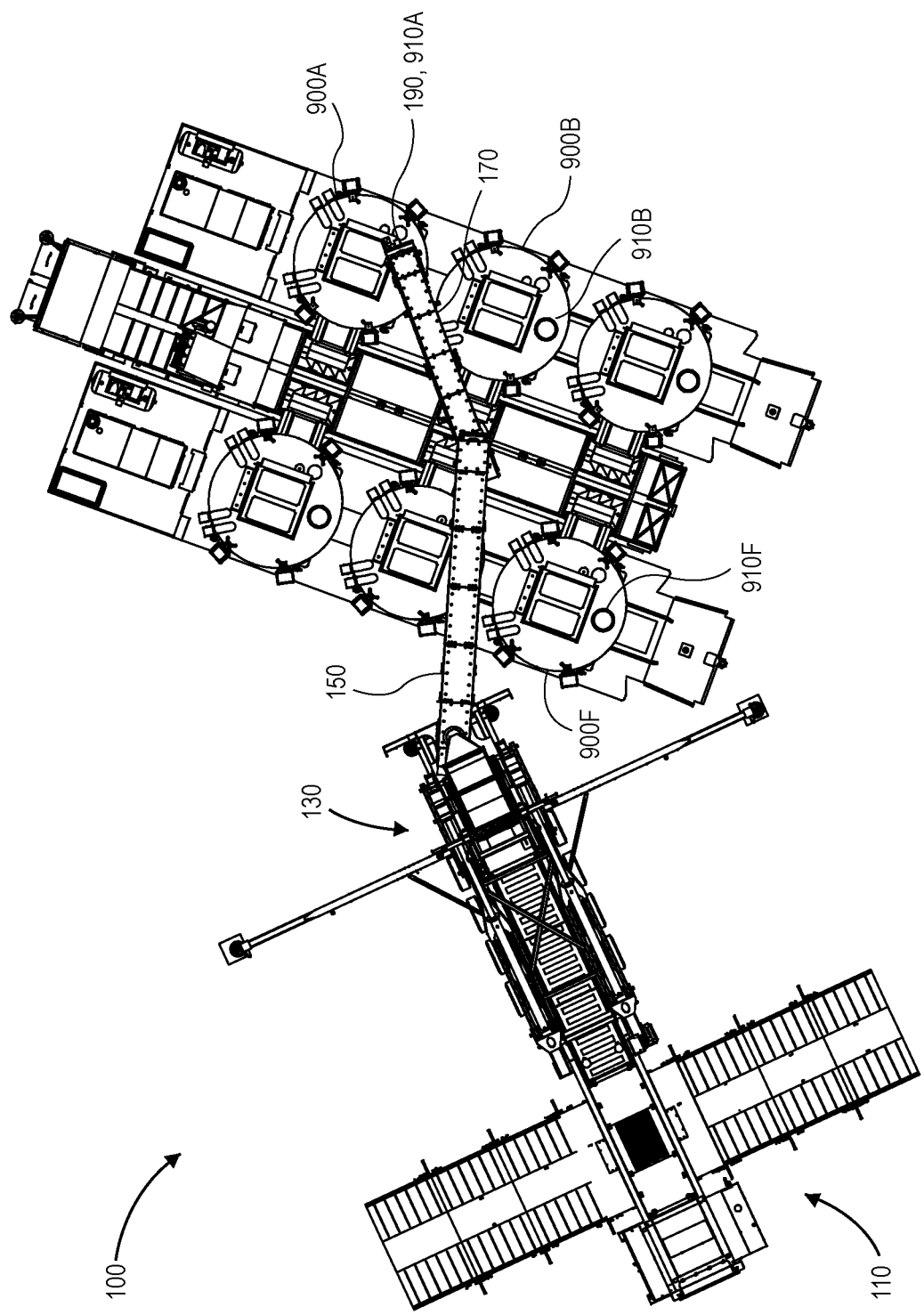
FIG. 9 illustrates a top view of the system in the unfolded state with the outer conveyor positioned over one or more silos, according to an embodiment.

The first arm 150 and/or the second arm 170 may be actuated to align the loading spout 190 with a silo. FIG. 9 illustrates a top view of the system 100 in the unfolded state with the loading spout 190 positioned over one or more silos 900A-900F, according to an embodiment. More particularly, the arms 150, 170 have been actuated to place the loading spout 190 over an inlet 910A of the silo 900A.

The method 200 may also include adjusting a height of the loading spout 190, as at 230. The height of the loading spout 190 may be adjusted with respect to inlet 910A of the silo 900A. More particularly, the height may be adjusted to insert the loading spout 190 at least partially into the inlet 910A of the silo 900A. The height may be adjusted by telescoping the loading spout 190 (e.g., downwards toward the inlet 910A). The height may also or instead be adjusted by adjusting the angle of the derrick 130 with respect to the ground.

The method 200 may also include conveying the proppant, as at 235. The proppant may be conveyed when the system 100 is in the partially unfolded state and/or the unfolded state. The proppant may be conveyed from the first conveyor 120 on the base 110, to the second conveyor 140 on the derrick 130, to the third conveyor 160 on the first arm 150, to the fourth conveyor 180 on the second arm 170, through the loading spout 190, and into the inlet 910A of the silo 900A.

Once the silo 900A is full, the method 200 may loop back around (e.g., to step 215, 220, 225, and/or 230). For example, the height of the loading spout 190 may be adjusted to withdraw the loading spout 190 from the inlet 910A of the silo 900A. Then, the arms 150, 170 may be actuated to align the loading spout 190 with an inlet 910B of a different (e.g., empty) silo 900B. Then, the height of the loading spout 190 may be adjusted to insert the loading spout 190 into the inlet 910B of the silo 900B. Then, the proppant may be conveyed into the silo 900B. This process may repeat to fill additional silos 900A-900F.

In an embodiment, the silos 900A-900F may be filled using the system 100 while the base 110 remains stationary. The system 100 may convey the proppant at a rate from about 2,000 pounds (lbs) per minute to about 20,000 lbs per minute or from about 5,000 lbs per minute to about 15,000 lbs per minute. In contrast, conventional pneumatic conveyors may only convey at a rate up to about 1,500 lbs per minute.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

What is claimed is:

1. A system, comprising:
   a base configured to be positioned on a ground, wherein the base comprises a first conveyor configured to convey a granular material;
   a derrick coupled to the base, wherein the derrick is configured to be oriented substantially horizontally when the system is in a folded state, wherein the derrick is configured to be oriented substantially vertically when the system is in an unfolded state, and wherein the derrick comprises a second conveyor configured to receive the granular material from the first conveyor and to convey the granular material; and
   a first arm having a first end that is coupled to the derrick, wherein the first arm comprises a third conveyor configured to receive the granular material from the second conveyor and to convey the granular material, and wherein the first arm is configured to rotate around the first end thereof in a first horizontal plane through a first angle.

2. The system of claim 1, wherein the system is configured to be coupled to a vehicle and to be moved by the vehicle when in the folded state, and wherein the system has a length that is less than 70 feet when in the folded state.

3. The system of claim 1, wherein the first conveyor comprises a trough-style unloading conveyor, wherein the second conveyor comprises a bucket elevator, and wherein the third conveyor comprises a trough-style distributing conveyor.

4. The system of claim 1, wherein the derrick is configured to be oriented at an angle from about 20 degrees to about 70 degrees with respect a ground when the system is in a partially unfolded state, and wherein the first conveyor, the second conveyor, and the third conveyor are configured to convey the granular material when the system is in the partially unfolded state.

5. The system of claim 1, wherein the first arm is configured to be oriented substantially horizontally when the system is in the folded state and the unfolded state.

6. The system of claim 1, further comprising a second arm coupled to the first arm, wherein the second arm comprises a fourth conveyor configured to receive the granular material from the third conveyor and to convey the granular material.

7. The system of claim 6, further comprising a loading spout coupled to the second arm, wherein the loading spout is configured to telescope vertically, and wherein the loading spout is configured to receive the proppant from the fourth conveyor and to load the proppant into an inlet in an upper portion of a silo.

8. The system of claim 6, wherein a second end of the first arm is coupled to a first end of the second arm, and wherein the second arm is positioned below the first arm.

9. The system of claim 8, wherein the second arm is configured to rotate around the first end thereof in a second horizontal plane through a second angle, and wherein a maximum extent of the second angle is greater than a maximum extent of the first angle.

10. The system of claim 9, wherein the first and second arms being configured to rotate allows the system to load the granular material into a plurality of different silos while the base remains stationary.

11. A mobile silo-filling system, comprising:
    a base configured to be positioned on a ground, wherein the base comprises:
      a truck unloader having a plurality of wheels; and
      a first conveyor configured to convey a proppant, wherein the first conveyor comprises a trough-style unloading conveyor;
    a derrick having a first end that is coupled to the base, wherein the derrick is configured to be oriented substantially horizontally when the system is in a folded state, wherein the system is configured to be coupled to a vehicle and to be moved by the vehicle when in the folded state, wherein the derrick is configured to be oriented at an angle from about 20 degrees to about 70 degrees when the system is in a partially unfolded state, wherein the derrick is configured to be oriented substantially vertically when the system is in an unfolded state, wherein the derrick comprises a second conveyor configured to receive the proppant from the first conveyor and to convey the proppant when the system is in the partially unfolded state, the unfolded state, or both, and wherein the second conveyor comprises a bucket elevator;
    one or more hydraulic cylinders coupled to the base and the derrick, wherein the one or more hydraulic cylinders are configured to actuate the system between the folded state, the partially unfolded state, and the unfolded state;
    a first arm having a first end that is coupled to a second end of the derrick, wherein the first arm is configured to be substantially horizontal when the system is in the folded state, the partially unfolded state, and the unfolded state, wherein the first arm is configured to rotate around the first end thereof in a first horizontal plane, wherein the first arm comprises a third conveyor configured to receive the proppant from the second conveyor and to convey the proppant, and wherein the third conveyor comprises a trough-style distributing conveyor;
    a first slewing gear configured to transfer the proppant from the second conveyor to the third conveyor;
    a second arm having a first end that is coupled to a second end of the first arm, wherein the second arm is positioned below the first arm, wherein the second arm is configured to be substantially horizontal when the system is in the folded state, the partially unfolded state, and the unfolded state, wherein the second arm is configured to rotate around the first end thereof in a second horizontal plane, wherein the second arm comprises a fourth conveyor configured to receive the proppant from the third conveyor and to convey the proppant, and wherein the fourth conveyor comprises a trough-style distributing conveyor;

a second slewing gear configured to transfer the proppant from the third conveyor to the fourth conveyor; and a loading spout coupled to the second arm proximate to a second end of the second arm, wherein the loading spout is configured to telescope vertically, and wherein the loading spout is configured to receive the proppant from the fourth conveyor and to load the proppant into an inlet in an upper portion of a silo.

12. The mobile silo-filling system of claim 11, wherein the system has a length that is less than 60 feet in the folded state and the unfolded state.

13. The mobile silo-filling system of claim 11, wherein none of the first conveyor, the second conveyor, the third conveyor, and the fourth conveyor are pneumatic.

14. The mobile silo-filling system of claim 11, wherein the first conveyor, the second conveyor, the third conveyor, and the fourth conveyor are configured to transfer from about 2000 pounds per minute to about 15,000 pounds per minute of the proppant into the silo.

15. The mobile silo-filling system of claim 11, wherein the first and second arms being configured to rotate allows the mobile silo-filling system to load the proppant into a plurality of different silos while the base remains stationary.

16. A method for loading proppant into a silo, the method comprising:

positioning a system at a wellsite using a vehicle, wherein the system comprises a base, a derrick, a first arm, and a second arm;

decoupling the system from the vehicle once the system is positioned, wherein the system is in a folded state when positioned and decoupled, and wherein the derrick is oriented substantially horizontally when the system is in the folded state;

actuating the system into an unfolded state after the system is decoupled, wherein the derrick is oriented substantially vertically when the system is in the unfolded state;

actuating the first arm when the system is in the unfolded state, wherein actuating the first arm comprises rotating the first arm around a first end thereof in a first horizontal plane through a first angle, wherein the first end of the first arm is coupled to the derrick; and conveying the proppant when the system is in the unfolded state, wherein the proppant is conveyed from a first conveyor on the base, to a second conveyor on the derrick, to a third conveyor on the first arm, to a fourth conveyor on the second arm, and into the silo.

17. The method of claim 16, further comprising actuating the second arm when the system is in the unfolded state, wherein actuating the second arm comprises rotating the second arm around a first end thereof in a second horizontal plane through a second angle, wherein the first end of the second arm is coupled to a second end of the first arm.

18. The method of claim 17, wherein a maximum range of the first angle is less than a maximum range of the second angle.

19. The method of claim 17, wherein actuating the first and second arms allows the system to convey the granular material into a plurality of different silos while system is in the unfolded position and the base remains stationary.

* * * * *